Patented Feb. 3, 1925.

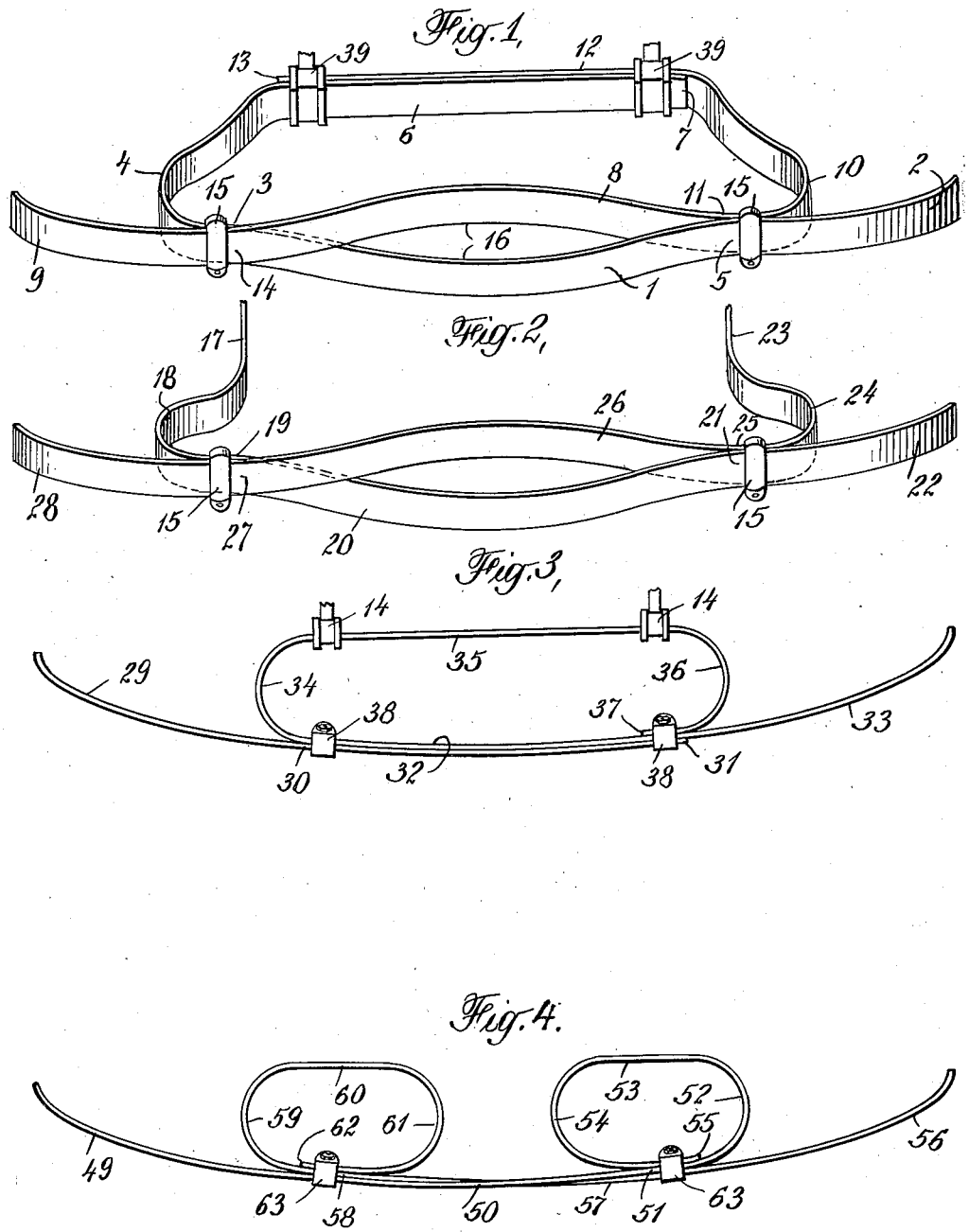

1,524,986

UNITED STATES PATENT OFFICE.

GEORGE ALBERT LYON, OF PHILADELPHIA, PENNSYLVANIA.

RESILIENT AUTOMOBILE BUFFER.

Application filed May 19, 1923. Serial No. 640,090.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Resilient Automobile Buffers, of which the following is a specification, taken in connection with the accompanying drawing, which forms part of the same.

This invention relates especially to buffers for automobiles or other vehicles having resilient strip buffer front members in which the laterally extending front strips comprise outwardly projecting free ends extending to and forming the lateral ends of the buffer front as covered by the Lyon Patent 1,247,300 of November 20, 1917. If desired, the buffer front may be formed of two similar spring steel strips or members each comprising a free end forming the lateral end of the buffer and preferably comprising vertically displaced or bent central portions adapted to be connected so as to form oppositely bent vertically wide central impact portions. The strips then preferably extend backward in the form of reversely bent resilent supporting portions which may have rearwardly extending attaching ends to be clamped or connected to the sides of the automobile frame members; or, if desired, the buffer strips may have inturned laterally extending supporting portions adapted to extend laterally between the frame members and be secured to special frame ends so as to form a supporting or brace bar portion to not only support the buffer front but reenforce the frame members as well.

In the accompanying drawing showing in a somewhat diagrammatic way various illustrative embodiments of this invention:

Figs. 1 and 2 are front perspective views showing illustrative buffer constructions, and Figs. 3 and 4 are top views showing still other illustrative buffers.

The illustrative buffer shown in Fig. 1 may be formed of two similar steel strip members which may, if desired, be formed of hardened and tempered spring steel strip one-quarter to three-eighths of an inch thick and two to three inches wide more or less. Each of these buffer members may comprise a free end such as the rearwardly inclined strip end 2 which may extend outward to and end at the lateral end of the buffer. This member has a front connecting portion at 5 and the inwardly extending central portion of this buffer front strip may, if desired, be vertically displaced or curved at 1 where vertically wide buffer front impact portions are desired. On the other side of the center of the buffer front this member has a front connecting portion 3 and then curves outward and rearward in the form of an oppositely curved portion, if desired, so as to form a resilient supporting portion 4 of the buffer member to be connected in any desired way to the automobile. For this purpose the member may be formed with an inturned laterally extending supporting portion 6 of such length as to extend across between the frame members of the automobile which may be provided with built in or otherwise connected frame ends such as 39 to engage and securely clamp this supporting member and thus securely support the buffer front portions of the member in desired position considerably ahead of this rear supporting portion. If desired, the other cooperating buffer member may be of substantially similar construction and may comprise a laterally extending buffer front portion including the rearwardly inclined free end 9 and the front contact portions 14 and 11 on opposite sides of the center of the buffer front between which points the front strip may be vertically displaced at 8 so as to form oppositely curved or bent front impact portions which may have a lenticular opening 16 between their adjacent edges. This strip member may have a rearwardly extending curved resilient portion 10 and an inturned laterally extending rear supporting portion 12 adapted to more or less overlap the other rear supporting portion or strip 6 so as to form a multiple strip rear supporting portion of the buffer between the frame ends 39. If desired, these two similar cooperating strip members may be laterally adjustable so as to give several inches lateral adjustment in the width of the buffer front and this means a similar amount of adjustment in the rear supporting portions or strips 6, 12 whose ends 7, 13 should preferably extend into or through the frame ends 39 to which they may be rigidly clamped or bolted. The overlapping front connecting portions of these buffer members may be securely clamped in any suitable way as by the enclosing clamping members 15 which securely hold them in the desired position after they have been laterally adjusted. Such buffer members may, of course, be bent and formed around one or more suitable forms preferably while heated and may then, if desired, be oil quenched and tempered where additional resilient strength and stiffness are desired. For some purposes it is still more desirable to have the generally similar steel strip buffer members formed with rearwardly extending attaching ends so as to be clamped or otherwise connected to the sides of the automobile frame members. This type of construction is shown in Fig. 2 as comprising two generally similar buffer members which preferably, though not necessarily, have vertically separated wide front contact portions as indicated. One of these strip members which may be made of tempered spring steel may have the rearwardly extending attaching end 17 continuing, if desired, in a doubly curved portion so as to form a resilient forwardly and outwardly extending portion 18 and support the front contact portion 19 of the member considerably ahead of the frame ends. This buffer member may then extend laterally across the buffer front in the form of a vertically bent or displaced portion 20, the other front connecting portion 21 of this member being, however, preferably in line with the opposite connecting portion 19 and with the outwardly extending free end 22 of the strip which may form the lateral end of the buffer front. The other strip member may have the similar free end 28 and front contact portion 27, 25 between which the strip may be vertically displaced or curved as at 26. The strip may then have the bent resilient portion 24 and the rearwardly extending attaching end 23 to be connected to the frame member of the automobile. These two strip members may be laterally adjustable to some slight extent at least and may be securely connected in a vertically rigid manner as by the enclosing clamping members or clips 15 which may encircle their overlapping front connecting portions which may be arranged so that the free ends of the strip members and their adjacent front connecting portions are located ahead of the overlapping connecting portions 19, 25 of the other strip members.

Fig. 3 shows another illustrative buffer construction in which one steel strip member may comprise one of these laterally extending free ends of the buffer front and also the entire rear supporting or brace bar portion and the forwardly extending resilient bent portions of the buffer on both sides of this supporting portion. This strip member may thus comprise the laterally extending free end 33 and the buffer front portion 32 of this strip which may then be formed with a rearwardly bent resilient portion 34 and a laterally extending rear supporting portion 35 which may be clamped or connected to the frame ends 14 of the automobile. The other end of this brace bar portion 35 may extend in a forwardly and outwardly bent resilient portion 36 so as to form a front connecting portion 37 to be clamped or connected to the cooperating connecting portion of the other strip element which may have a front end connecting portion 31 and extending laterally across the buffer front in overlapping or vertically displaced oppositely bent position, as desired, forming the other front connecting portion 30 and free end 29 extending in front of the automobile wheels, if desired. Two suitable clamping devices 38 may connect these overlapping connecting portions of the strip members so as to securely hold the parts in position.

Fig. 4 shows another illustrative buffer of this type which may be formed of two generally steel strip members each having a free end forming the lateral end of the buffer front and then extending across the central part of the buffer front and formed with a separate closed loop or other resilient portion having a rearwardly extending supporting member or portion to be clamped or connected to the automobile. This gives a considerable range of lateral adjustment and forms a buffer which when disconnected can be closely nested for shipping purposes as well as being strong and reliable in operation. One of these generally similar buffer members may comprise the free end 49 of the strip member integrally connected with the laterally extending buffer front portion 50 which may be vertically displaced so as to extend above the other buffer front strip or member at this point and form a front connecting portion 51. The strip may then be outwardly and rearwardly curved at 52 so as to form the laterally extending supporting portion 53 eight or ten inches more or less back of the buffer front and also joined thereto, if desired, by an inwardly and forwardly bent or curved portion 54 having a connecting end 55 so as to form a substantially closed supporting loop. The other generally similar buffer member may have a free strip end 56 and a vertically displaced buffer front having front connecting portions 57, 58. The member then curves outward and rearward at 59 so as to form the rear supporting portion 60 which may also be joined by the bent portion 61 with a front connecting end 62 of the strip overlapping the cooperating connecting portions at this point. All these connecting portions may be securely bolted or clamped in laterally adjusted position by any suitable type of clamping members such as 63 which may more or less enclose these buffer strips so as to securely hold them in mutually reenforcing position under collision conditions.

This invention has been described in connection with a number of embodiments, forms, proportions, sizes, parts, arrangements, materials, methods of construction, connection and use, to the details of which disclosure the invention is not of course to be limited, since what is claimed as new and what is desired to be secured by Letters Patent is set forth in the appended claims:

1. The automobile buffer comprising a pair of similar buffer members of wide thin tempered spring steel strip each comprising a rear supporting attaching portion, a forwardly extending curved resilient portion and a laterally extending buffer front portion having a rearwardly inclined free end extending outward to and forming the lateral end of the buffer front, and enclosing clamping devices engaging the overlapping front connecting portions of said members one on each side of the center of the buffer front and rigidly holding them in laterally adjusted position, the buffer front members being oppositely displaced to form a vertically wide oppositely bent central impact portion between said clamping devices.

2. The automobile buffer comprising a pair of similar buffer members of wide thin steel strip each comprising a rear supporting attaching portion, a forwardly extending curved resilient portion and a laterally extending buffer front portion having a free end extending outward to and forming the lateral end of the buffer front, and clamping devices engaging the overlapping front connecting portions of said members one on each side of the center of the buffer front and rigidly holding them in position, the buffer front members being oppositely displaced to form a vertically wide impact contact portion between said clamping devices.

3. The automobile buffer comprising a pair of similar buffer members of wide thin steel strip each comprising a rear supporting attaching portion, a forwardly extending doubly curved resilient portion and a laterally extending buffer front portion having a free end extending outward to and forming the lateral end of the buffer front, and clamping devices cooperating with the overlapping front portions of said members one on each side of the center of the buffer front and rigidly holding them in position, the buffer front members forming a vertically wide central impact portion.

4. The automobile buffer comprising buffer members of wide thin steel strip each comprising a rear supporting portion, a forwardly extending doubly curved resilient portion and a laterally extending buffer front portion having a free end extending outward to and forming the lateral end of the buffer front, and clamping devices cooperating with portions of said members and rigidly holding them in position.

5. The automobile buffer comprising a pair of connected similar buffer members of wide thin steel strip each comprising a rear attaching portion, a forwardly extending doubly curved resilient portion and a laterally extending forwardly arched buffer front portion having a free end extending outward to and forming the lateral end of the buffer front, the buffer front members forming a vertically wide central impact portion.

6. The automobile buffer comprising a pair of connected buffer members of wide thin steel strip each comprising a rear attaching portion, a forwardly extending curved resilient portion and a laterally extending buffer front portion having a free end extending outward to and forming the lateral end of the buffer front.

7. The automobile buffer comprising two connected integral buffer members of wide thin steel strip each comprising a rear attaching portion, a forwardly extending outwardly curved resilient portion and a laterally extending buffer front portion having a free end extending outward to and forming the lateral end of the buffer front considerably beyond the other connected buffer member.

8. The automobile buffer comprising two connected integral buffer members or wide thin steel strip each comprising a rear attaching portion, a forwardly extending resilient portion and a laterally extending buffer front portion having a free end extending outward to and forming the lateral end of the buffer front.

9. The automobile buffer formed of two connected similar buffer members of wide thin steel strip each comprising a rear supporting portion adapted to be secured to the automobile frame member and comprising an outwardly and forwardly extending doubly curved resilient portion, a laterally extending front connecting and impact portion vertically displaced to form a vertically wide central impact portion and a rearwardly inclined free end extending outward considerably beyond the other cooperating buffer front portions and forming the lateral end of the buffer front between said clamping devices.

10. The automobile buffer formed of two connected similar buffer members of wide thin steel strip each comprising a rear supporting portion adapted to be secured to the automobile frame members and comprising an outwardly and forwardly extending portion, a laterally extending front connecting and contact portion vertically displaced to form a vertically wide central impact portion and a free end extending outward considerably beyond the other cooperating buffer front portions and forming the lateral end of the buffer front.

11. The automobile buffer formed of a pair of similar buffer member of wide thin spring steel strip each comprising a rear supporting attaching portion adapted to be secured to the automobile frame members and comprising an outwardly and forwardly extending doubly curved resilient portion, a laterally extending front connecting portion, a vertically displaced curved front impact portion and a rearwardly inclined outwardly extending free end extending to and forming the lateral end of the buffer front, and enclosing clamping devices engaging the overlapping front connecting portions of said members and rigidly holding them in laterally adjusted position to form a vertically wide oppositely bent central impact portion between said clamping devices.

12. The automobile buffer formed of a pair of similar buffer members of wide thin spring steel strip each comprising a rear supporting attaching portion adapted to be secured to the automobile frame members and comprising an outwardly and forwardly extending doubly curved resilient portion, a laterally extending front connecting portion, a vertically displaced front impact portion and a free end extending to and forming the lateral end of the buffer front, and clamping devices engaging the overlapping front connecting portions of said members and rigidly holding them in position to form a vertically wide oppositely bent central contact portion between said clamping devices.

13. The automobile buffer formed of two generally similar connected buffer members of wide thin spring steel strip each comprising a rear attaching portion adapted to be secured to the automobile frame members and comprising a forwardly extending outwardly curved resilient portion, a laterally extending front connecting and impact portion, and an outwardly extending free end extending to and forming the lateral end of the buffer front.

14. The automobile buffer formed of two generally similar connected buffer members of wide thin spring steel strip each comprising a rear attaching portion adapted to be secured to the automobile frame members and comprising a forwardly and outwardly curved resilient portion, a laterally extending front connecting and impact portion, and a free end extending to and forming the lateral end of the buffer front.

GEORGE ALBERT LYON.